US012671667B1

(12) United States Patent
Bulmer et al.

(10) Patent No.: US 12,671,667 B1
(45) Date of Patent: Jun. 30, 2026

(54) CONTEXT-BASED CHANNEL RECOMMENDATION AND MANAGEMENT

(71) Applicant: Zoom Video Communications, Inc., San Jose, CA (US)

(72) Inventors: Bryan James Bulmer, Edmonds, WA (US); Lisa Ann Gervais, Denver, CO (US); Lin Han, Los Altos, CA (US); Ying Lu, Cerritos, CA (US); Kai Ni, Sammamish, WA (US); Longdong Tai, Suzhou (CN); Wang Tian, Hefei (CN); Yingying Zhang, Hefei (CN); Huilian Zhao, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/390,563

(22) Filed: Dec. 20, 2023

(51) Int. Cl.
| | |
|---|---|
| *H04L 51/52* | (2022.01) |
| *H04L 51/212* | (2022.01) |
| *H04L 51/216* | (2022.01) |

(52) U.S. Cl.
CPC ............ *H04L 51/52* (2022.05); *H04L 51/212* (2022.05); *H04L 51/216* (2022.05)

(58) Field of Classification Search
CPC ...... H04L 51/52; H04L 51/212; H04L 51/216
See application file for complete search history.

(56) References Cited

U.S. PATENT DOCUMENTS

| | | | | |
|---|---|---|---|---|
| 7,509,295 | B2 * | 3/2009 | Rokosz | G06Q 10/107 709/204 |
| 9,129,227 | B1 | 9/2015 | Yee et al. | |
| 9,799,082 | B1 | 10/2017 | Raskin et al. | |
| 10,409,859 | B2 | 9/2019 | Gupta et al. | |
| 10,536,542 | B1 | 1/2020 | Dorner et al. | |
| 10,574,712 | B2 | 2/2020 | Dhoot et al. | |
| 11,151,203 | B2 | 10/2021 | Natchu | |
| 12,361,004 | B1 | 7/2025 | Dong et al. | |
| 12,367,420 | B2 | 7/2025 | Divakaran et al. | |
| 2009/0106040 | A1 * | 4/2009 | Jones | G06Q 30/02 705/319 |
| 2010/0293104 | A1 * | 11/2010 | Olsson | H04L 12/1818 707/E17.107 |
| 2015/0370798 | A1 * | 12/2015 | Ju | H04L 12/185 707/748 |
| 2018/0246899 | A1 | 8/2018 | Natchu et al. | |
| 2018/0246973 | A1 | 8/2018 | Zhao et al. | |
| 2019/0266283 | A1 | 8/2019 | Shukla et al. | |

(Continued)

OTHER PUBLICATIONS

U.S. Appl. No. 18/390,582, "Non-Final Office Action", Aug. 6, 2025, 19 pages.

*Primary Examiner* — Caroline H Jahnige

(74) *Attorney, Agent, or Firm* — Kilpatrick Townsend & Stockton, LLP

(57) ABSTRACT

Example methods and systems for context-based channel recommendation and management are provided. A communication platform accesses a first set of user data associated with a first user on the communication platform and channel data associated with a plurality of chat channels on the communication platform. The communication platform determines one or more recommended chat channels for the first user based on the first set of user data and the channel data. The communication platform provides the one or more recommended chat channels to the first user.

17 Claims, 10 Drawing Sheets

(56) References Cited

U.S. PATENT DOCUMENTS

| | | | |
|---|---|---|---|
| 2020/0026772 A1 | 1/2020 | Wheeler | |
| 2020/0059375 A1* | 2/2020 | Hewitt | G06F 40/30 |
| 2020/0112755 A1* | 4/2020 | Seshadri | G06N 3/045 |
| 2020/0403955 A1* | 12/2020 | Chen | H04L 67/306 |
| 2023/0334261 A1 | 10/2023 | Mulford et al. | |
| 2024/0144393 A1* | 5/2024 | Yoon | G06Q 50/01 |
| 2024/0179193 A1* | 5/2024 | Maurer | G06N 3/08 |

* cited by examiner

300

COMMUNICATION PLATFORM 310

NETWORK 320

CLIENT DEVICE 340A

CLIENT DEVICE 340B

CLIENT DEVICE 340N

400

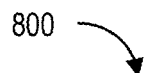

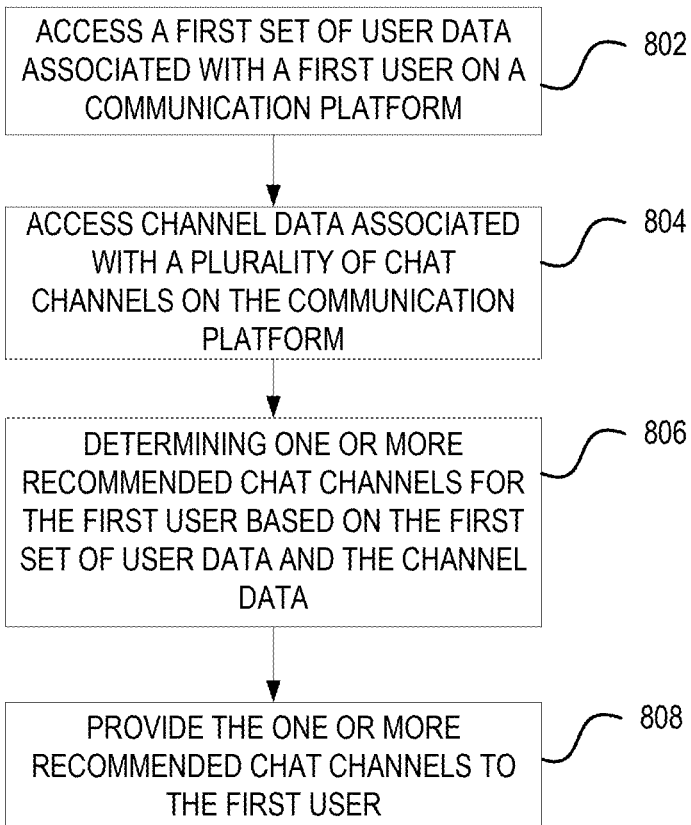

ACCESS A FIRST SET OF USER DATA ASSOCIATED WITH A FIRST USER ON A COMMUNICATION PLATFORM    802

ACCESS CHANNEL DATA ASSOCIATED WITH A PLURALITY OF CHAT CHANNELS ON THE COMMUNICATION PLATFORM    804

DETERMINING ONE OR MORE RECOMMENDED CHAT CHANNELS FOR THE FIRST USER BASED ON THE FIRST SET OF USER DATA AND THE CHANNEL DATA    806

PROVIDE THE ONE OR MORE RECOMMENDED CHAT CHANNELS TO THE FIRST USER    808

*FIG. 8*

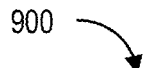

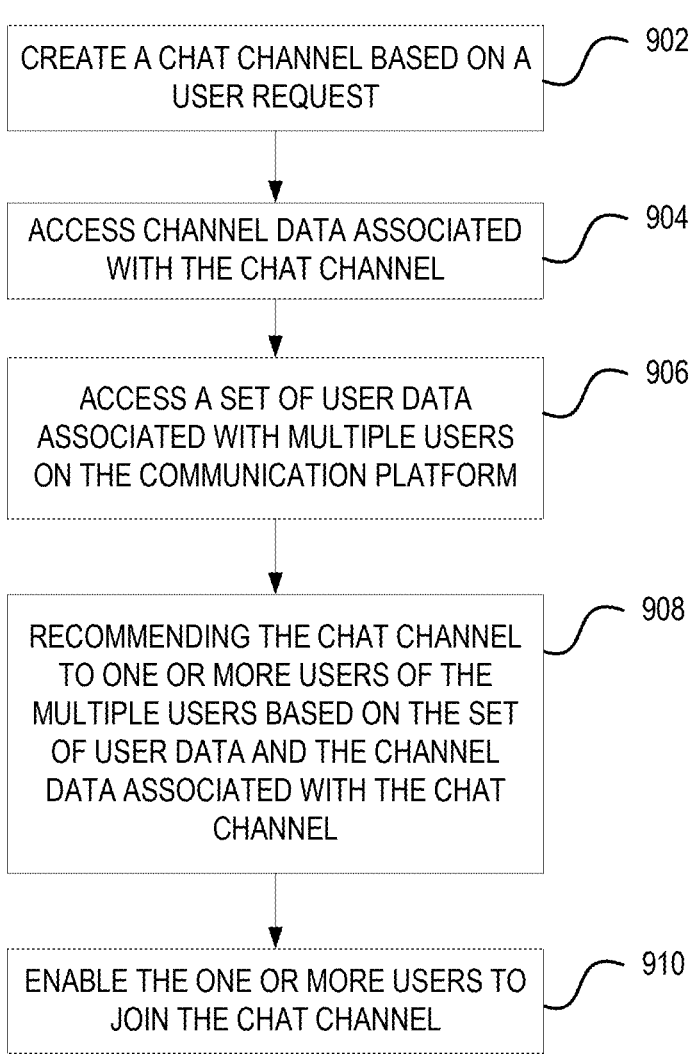

900

CREATE A CHAT CHANNEL BASED ON A USER REQUEST — 902

ACCESS CHANNEL DATA ASSOCIATED WITH THE CHAT CHANNEL — 904

ACCESS A SET OF USER DATA ASSOCIATED WITH MULTIPLE USERS ON THE COMMUNICATION PLATFORM — 906

RECOMMENDING THE CHAT CHANNEL TO ONE OR MORE USERS OF THE MULTIPLE USERS BASED ON THE SET OF USER DATA AND THE CHANNEL DATA ASSOCIATED WITH THE CHAT CHANNEL — 908

ENABLE THE ONE OR MORE USERS TO JOIN THE CHAT CHANNEL — 910

*FIG. 9*

CONTEXT-BASED CHANNEL RECOMMENDATION AND MANAGEMENT

FIELD

The present application generally relates to virtual communication and more specifically relates to context-based channel recommendation and management.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 8 shows an example method for context-based channel recommendation and management;

FIG. 9 shows another example method for context-based channel recommendation and management.

DETAILED DESCRIPTION

Figure 1:
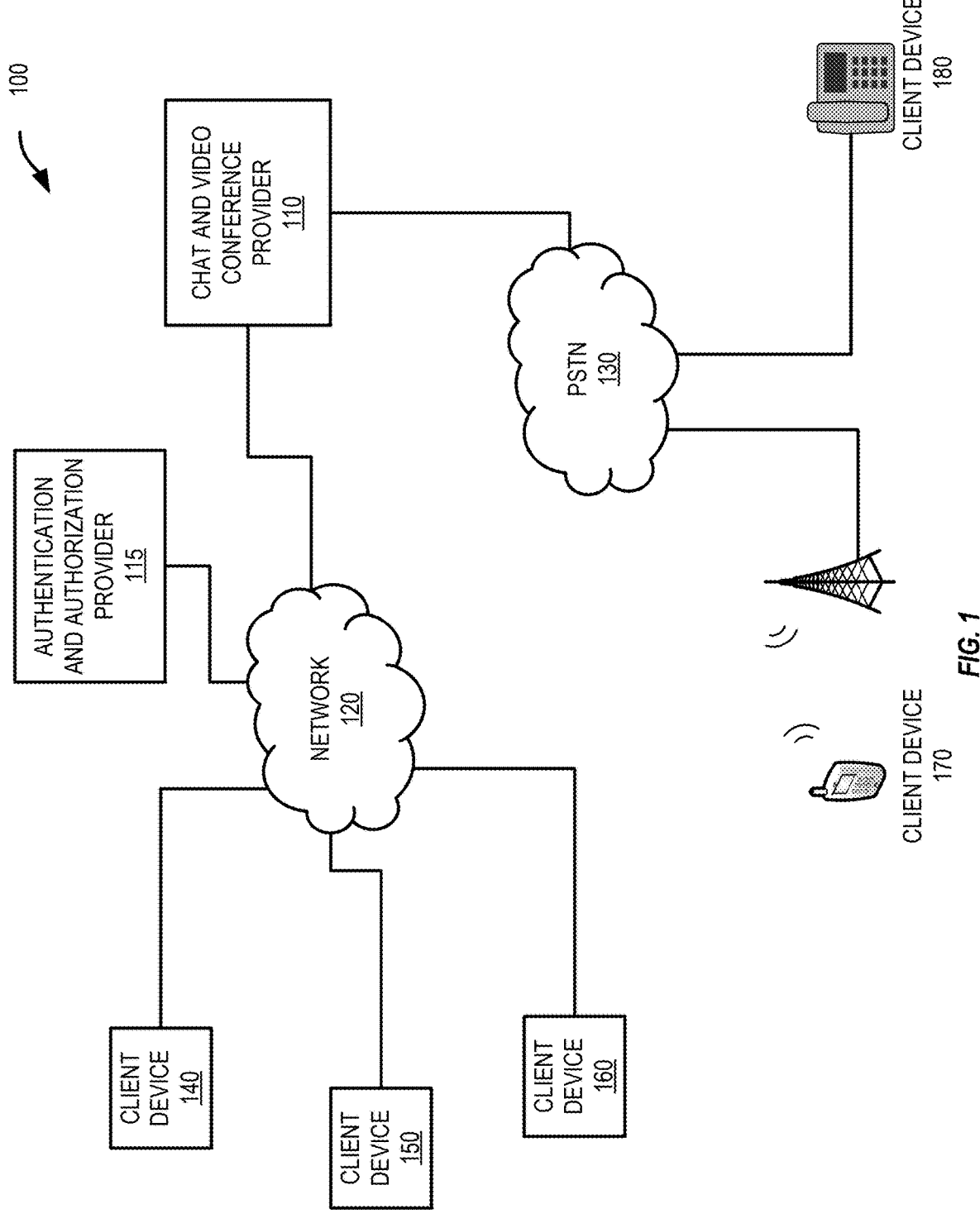
FIG. 1 shows an example system that provides videoconferencing and chat functionality to various client devices.

Examples are described herein in the context of context-based channel recommendation and management. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Chat channels have become an important forum for users to share information, ask and answer questions, discuss certain topics, or communicate for any other suitable purposes. There can be various chat channels within an organization or in an open platform. Users may not know or be able to find the chat channels that are interesting or beneficial to them by simple keyword search.

To facilitate users to find relevant chat channels, it is desirable for a communication platform to automatically recommend chat channels in the context of user activities and channel activities. For example, an example communication platform provides a channel recommendation engine for automatically providing recommended chat channels to a user based on user data and channel data and a channel management engine for organizing chat channels associated with a user.

The channel recommendation engine can collect or access user data, including user profile data and user activity data. The user profile data includes user location, job title (or occupation), education, joined chat channels, chat contacts, and other data that can describe a user. The user activity data includes user interactions with chat contacts or other users, user activities in the joined chat channels, user search activities, or other user activities on the communication platform. The channel recommendation engine can also collect or access channel data, including channel profile data and channel activity data. The channel profile data includes a channel name, a channel description, and member data (e.g., number of members, member profile data). The channel activity data includes chat messages from members of the channel and information about the chat messages, such as chat message time, chat frequency, active members, chat topics, etc.

The channel recommendation engine can analyze the user data and channel data to determine recommended chat channels. In some examples, the channel recommendation engine can implement a collaborative filtering algorithm to identify similar users to a user to determine recommended chat channels for the user. For example, the channel recommendation engine can identify a first set of users whose profiles are similar to the profile of a specific user, such as from the same location, from the same department, or with the same job title or occupation, and identify a first set of channels that the first set of users actively participate in. Alternatively, or additionally, the channel recommendation engine can create a social graph representing relationships between different users. For a specific user, the channel recommendation engine can identify a second set of users that the specific user interacts frequently with and identify a second set of channels that the first set of users actively participate in. The channel recommendation engine can select recommended channels from the first set of channels and/or the second set of channels. When a first-time user creates an account (e.g., login) on the communication platform, the user can provide certain interest areas by selecting certain topics. The channel recommendation engine can determine recommended channels based on the selected interest areas, which can be part of the user profile data.

In some examples, the channel recommendation engine can determine the most active existing channels and newly created channels based on the number of chat messages and the number of active users during a period of time (e.g., every day, or the past three days or five days). The channel recommendation engine can determine recommended channels from the active channels on the communication platform, for example in the context of the user data (e.g., user profile data and user activity data). For example, the most popular channel in the user's department can be recommended to the user, or the most active channel with content that matches or is relevant to the user's recent searches are recommended.

In some examples, the channel recommendation engine can determine recommended channels based on similarities between a user and different channels. The channel recommendation engine can implement a machine learning (ML) model to learn the similarities between users and channels. The user data associated with a user can be represented by an embedding vector. The channel data associated with a chat channel can also be represented by an embedding vector. A similarity score, for example a cosine similarity, can be determined based on a user embedding vector and a channel embedding vector, to represent the similarity between a user and a channel. Thus, different chat channels can be ranked based on their corresponding similarity scores with respect to a user. Certain channels whose similarity scores are above a predetermined threshold can be selected as recommended channels. The embedding vectors representing users and channels can be updated periodically based on the updates in user data and channel data.

The channel recommendation engine or a channel management engine can group recommended channels for a particular user into one or more categories based on how the recommended channels are selected or other criteria. The channel recommendation engine or the channel management engine can create channel category names accordingly. For example, if some recommended channels are selected based on users whose profiles are similar to that of the particular user, the category can be "people who are similar to you also joined these channels." Also for example, if some recommended channels are selected based on the overall activeness of the chat channels, the category can be "most active channels." Yet as another example, if certain recommended channels are selected because these channels have more new members joined than other channels, the category can be "trending channels." Yet another example, if certain recommended channels are selected because these channels include content that matches user searches or other activities related to a topic (e.g., database synchronization), the category can be "channels that discuss database synchronization."

The recommended channels or categories of recommended channels can be provided to a user via a graphical user interface (GUI). For example, a communication application provided by the communication platform and installed on a client device includes a "channel discovery" page or tab. A user can search channels via a search box in the "channel discovery" page. Recommended channels or categories of recommended channels can be displayed in GUI elements next to (e.g., below) the search box.

In some examples, the channel recommendation engine can generate a customized description of a recommended channel for a user. For example, if a channel is recommended because of its popularity, the description can include the number of posts or chat messages in a day. If a channel is recommended because certain users in the same department also joined, the description can include the number of users (or the usernames if accessible or authorized) from the same department as the user are in the channel. If a channel is recommended because certain channel content match certain user activity, such as searches about certain topic, the description of the recommended channel can include certain topics discussed in the channel.

The communication platform not only can provide and recommend chat channels within an enterprise, but also can provide and recommend chat channels to public individual users. The communication platform can integrate other communication functionalities with the chat channel functionality. For example, the communication platform can provide video conferencing and recording for channel users to communicate instantaneously or create and share video content. The communication platform can also provide phone calls, email, or other native applications or third-party integrated applications to chat channel users. The chat channels can be considered as online communities for channel users. The communication platform can facilitate channel creator to market and grow their online communities. The channel creator can also create sub-channels within a master channel to organize content or users within the master channel. The communication platform can provide life-cycle management for chat channels, from creating a channel to growing a channel by recommending the channel to relevant users.

Thus, this example automatically recommends chat channels to a user based on user data and channel data. The user can find interesting chat channels in the recommended channels to join, which may not be found via a keyword search. The recommended chat channels can better match user interest and meet user needs compared to channels found via keyword search, since the recommended chat channels are determined based on the context of user profiles, user activities, channel profile, and channel activities.

Applicant's goal is to invest in AI-driven innovation that enhances user experience and productivity while prioritizing trust, safety, and privacy. Applicant does not use any customer audio, video, chat, screen-sharing, attachments, or other communications-like customer content (such as poll results, whiteboards, or reactions) to train Applicant's or third-party artificial intelligence models. Additionally, AI-enabled features are turned off by default—account owners and administrators control whether to enable these AI features for their accounts. Applicant provides admins and users control and visibility when AI features are being used or activated. By putting its customers' privacy needs first, Applicant is taking a leadership position, enabling its customers to use AI-powered tools and its capabilities with confidence.

This illustrative example is given to introduce the reader to the general subject matter discussed herein and the disclosure is not limited to this example. The following sections describe various additional non-limiting examples and examples of context-based channel recommendation.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
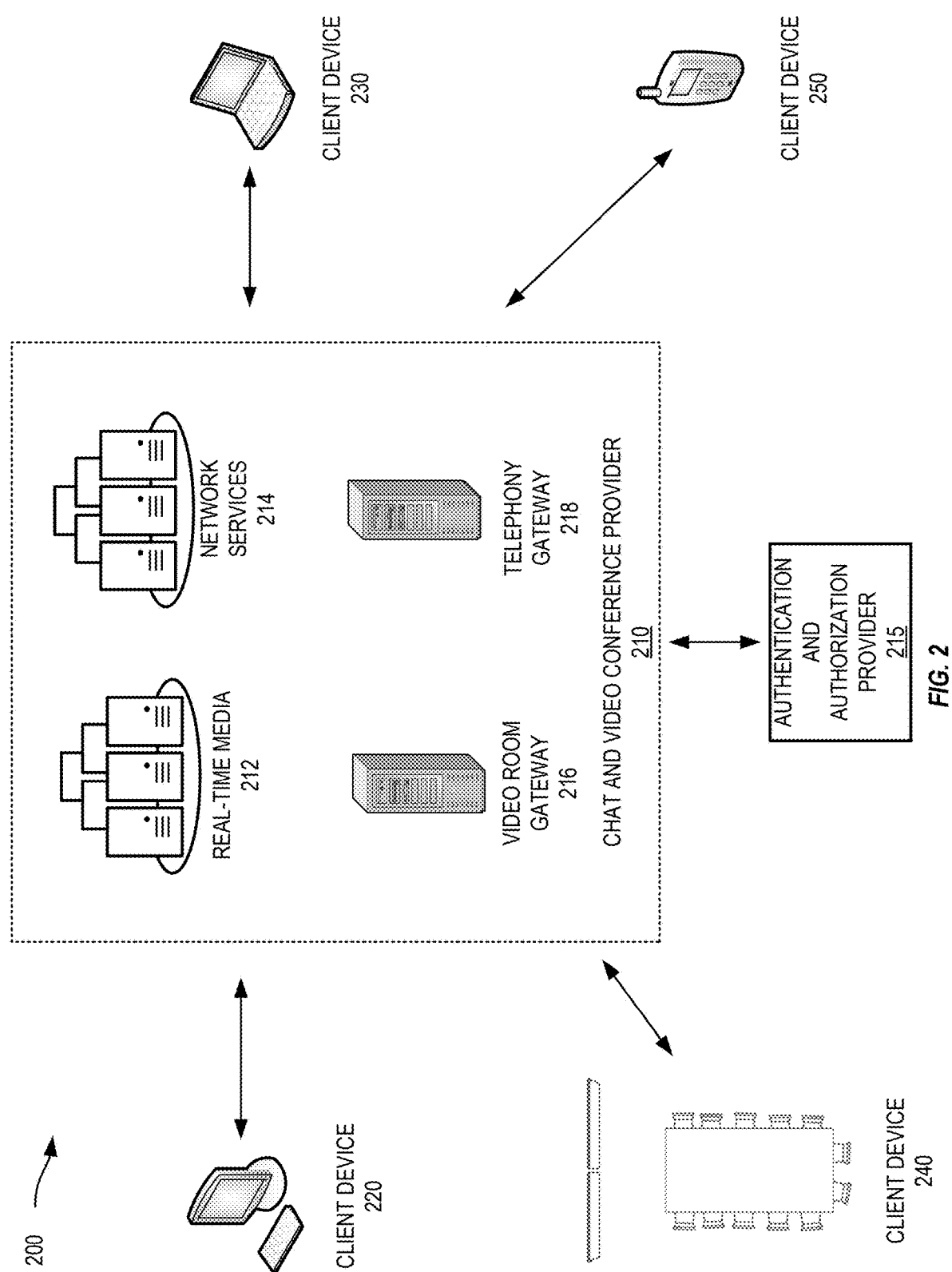
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
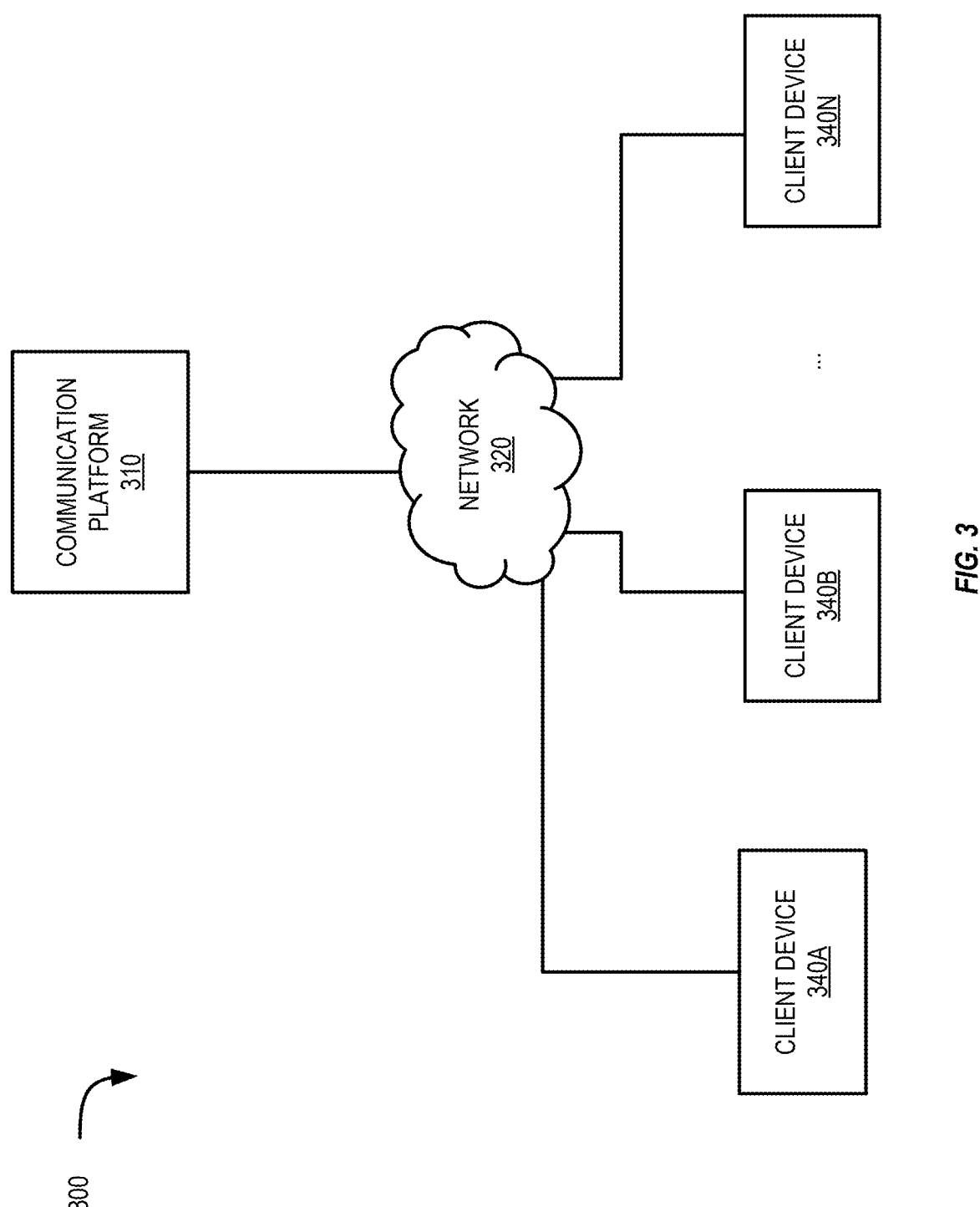
FIG. 3 shows an example system that can establish a virtual communication session.

Referring now to FIG. 3, FIG. 3 shows an example system 300 that can establish a virtual communication session. In this example system 300, a communication platform 310 and a number of client device 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a chat session, a user associated a client device (e.g., client device 340A) can interact with other users associated with other client devices (e.g., client device 340B-340N) via the communication platform 310 by sending and receiving chat messages, and reacting to received chat messages.

Figure 4:
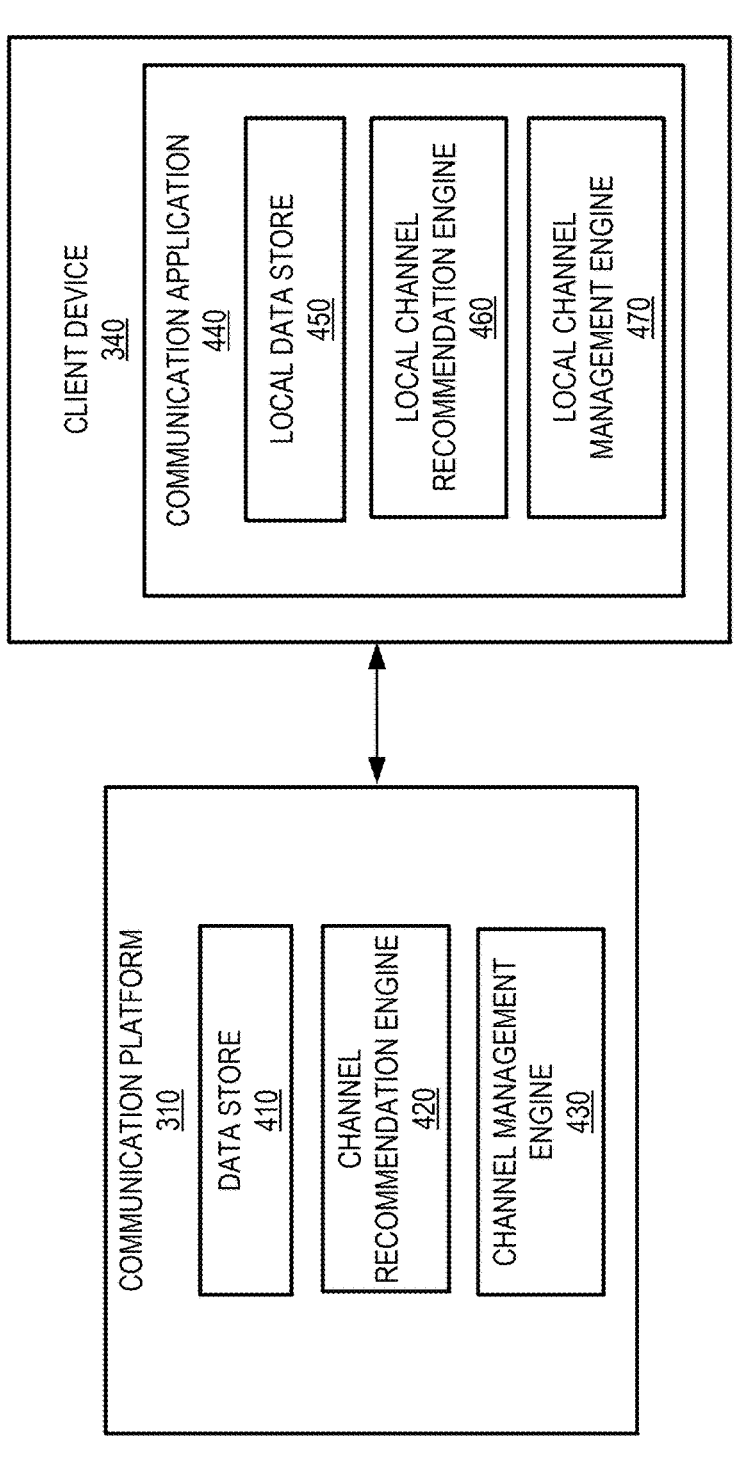
FIG. 4 shows an example system that is configured to automatically recommend and manage chat channels.

Now referring to FIG. 4, FIG. 4 shows an example system 400 that is configured to automatically recommend and manage chat channels. The communication platform 310 is in network communication with a client device 340. The client device 340 is installed with a communication application 440 provided by the communication platform 310. The communication platform 310 includes a data store 410, a channel recommendation engine 420, and a channel management engine 430. The data store 410 stores user data and channel data. User data can include user profile data and user activity data. Examples of user profile data include user location, job title (or occupation), education, joined chat channels, chat contacts, and other data that can describe a user. Examples of user activity data includes user interactions with chat contacts or other users, user activities in the joined chat channels, user search activities (e.g., searching for channels, or searching for certain materials), or other user activities on the communication platform. Channel data can include channel profile data and channel activity data. Examples of channel profile data include a channel name, a channel description, and channel member data (e.g., number of members, member profile data). Examples of channel activity data includes chat messages from members of the channel and information about the chat messages, such as chat message time, chat frequency, active members, chat topics, etc. Chat messages can include text-based messages, audio messages, video recordings, documents, and messages of any other suitable format.

The channel recommendation engine 420 can access the user data and channel data to determine recommended chat channels for different users. The channel recommendation engine 420 can implement certain artificial intelligence (AI) or machine learning (ML) techniques. In some examples, the channel recommendation engine 420 can implement a collaborative filtering model to identify users similar to a specific user and channel content similar to that of chat channels joined by the specific user. In some examples, the channel recommendation engine 420 can implement other recommendation algorithms, either AI/ML based or not.

In some examples, the channel recommendation engine 420 can identify a first set of users whose profiles are similar to the profile of the specific user, such as from the same location, from the same department, or with the same job title or occupation, and identify a first set of channels that the first set of users actively participate in. Alternatively, or additionally, the channel recommendation engine 420 can create a social graph representing relationships between different users. The channel recommendation engine 420 can implement or direct a graph engine (not shown) to generate the social graph. Alternatively, the channel recommendation engine 420 can access a social graph directly generated by a graph engine on the communication platform or a third-party graph engine. The social graph can be updated periodically based on user interactions. For a specific user, the channel recommendation engine can identify a second set of users that the specific user interacts frequently with and identify a second set of channels that the second set of users actively participate in. The channel recommendation engine 420 can select recommended channels from channels that are actively used by similar users or related users, for example from the first set of channels and the second set of channels.

In some examples, the channel recommendation engine 420 can determine active existing channels and newly created channels based on the number of new chat messages and the number of active users during a period of time (e.g., every day, or the past three days or five days). The channel recommendation engine 420 can further determine recommended channels for a specific user from the active channels on the communication platform 310, for example in the context of the user data (e.g., user profile data and user activity data). For example, the most popular channels in the user's department can be recommended to the user, or the most active channels with content that matches or is relevant (or similar) to the user's recent searches are recommended.

In some examples, the channel recommendation engine 420 can determine recommended channels based on similarities between a user and different channels. The channel recommendation engine 420 can implement an ML model, for example a similarity model, to learn the similarities between users and channels. The user data associated with a user can be represented by an embedding vector. The channel data associated with a chat channel can also be represented by an embedding vector. A similarity score, for example a cosine similarity, can be determined based on the embedding vector for a user and the embedding vector for a channel, to represent the similarity between a user and a channel. Thus, different chat channels can be ranked based on their corresponding similarity scores with respect to a user. If the similarity score is above a predetermined threshold, the corresponding chat channel can be selected as a recommended channel. The embedding vectors representing users and channels can be updated periodically based on the updates in user data and channel data.

When a first-time user creates an account (e.g., login) on the communication platform 310, the user can select certain interest areas. The channel recommendation engine 420 can determine recommended channels based on the selected interest areas. The selected interest areas can be part of the user profile data. The channel recommendation engine 420 can also recommend certain channels based on other user profile data collected from the first-time user, such as education, job title (occupation), etc. As the user interacts with other users or chat channels on the communication platform 310, more user data, for example chat contacts, joined channels, search activities, and other user activity data, can be collected and analyzed for channel recommendation.

The channel recommendation engine 420 can group recommended channels for a specific user into one or more categories based on how the recommended channels are selected or other criteria. The channel recommendation engine 420 can create channel category names accordingly. For example, if some recommended channels are selected based on users whose profiles are similar to that of the specific user, the category can be "people who are similar to you also joined these channels." Also for example, if some recommended channels are selected based on the overall activeness of the chat channels, the category can be "most active channels." Yet as another example, if certain recommended channels are selected because these channels have more new members joined than other channels, the category can be "trending channels." Yet as another example, if certain recommended channels are selected because these channels include content that matches user searches or other activities related to a topic (e.g., database synchronization), the category can be named based on the topic (e.g., "channels that discuss database synchronization").

The channel recommendation engine 420 can provide the recommended channels or categories of recommended channels to a user via a graphical user interface (GUI). For example, a communication application 440 provided by the communication platform 310 and installed on a client device 340, which will be described later, includes a "channel discovery" page or tab. A user can search channels via a search box in the "channel discovery" page. Recommended channels or categories of recommended channels can be displayed in GUI elements next to (e.g., below) the search box.

The channel recommendation engine 420 can generate a customized description of a recommended channel for a user. For example, if a channel is recommended because of its popularity, the description can include the number of posts or chat messages in a day. If a channel is recommended because certain users in the same department also joined, the description can include the number of users (or the usernames if accessible or authorized) from the same department as the user are in the channel. If a channel is recommended because certain channel content match certain user activity, such as searches about certain topic, the description of the recommended channel can include these topics being discussed in the channel.

The channel management engine 430 is configured to create and organize chat channels associated with a user. The channel management engine 430 can create a chat channel based on a user request. Alternatively, or additionally, the channel management engine 430 can create a chat channel automatically for a completed video conference, and channel members include participants in the video conference. The channel management engine 430 can create sub-channels within a master channel to organize content or users within the master channel. The channel management engine 430 can implement a classification algorithm to categorize channels based on channel activeness, channel type, and any other suitable criteria. A user can select one or more sorting standards (or criteria) to view channels sorted based on the one or more sorting standards (or criteria). For example, the channels associated with a user can be sorted based on the role of the user in corresponding channels. The role of the user can include a channel participant, a channel creator, or a channel administrator. The channel management engine 430 can also categorize recommended channels and generate category names or descriptions, similar to the channel recommendation engine 420 generally as described above.

The communication platform 310 not only can provide and recommend chat channels within an enterprise (a closed universe), but also can provide and recommend chat channels to public individual users. The communication platform 310 can integrate other communication functionalities with the chat channel functionality. For example, the communication platform 310 can provide video conferencing and recording functionalities for individual users to communicate instantaneously or create and share video content. The communication platform 310 can also provide phone calls, email, or other native applications or third-party integrated applications to chat channel users. The chat channels can be considered as online communities for individual users. A user can create a channel, and market and grow the chat channel as an online community on the communication platform 310. The channel recommendation engine 420 and the channel management engine 430 can manage a life cycle of a chat channel, including creating, recommending, growing, and organizing chat channels.

The communication application 440 installed on the client device 340 can include a local data store 450, a local channel recommendation engine 460, and a local channel management engine 470. The local data store 450 can store local user data (e.g., local user profile data and local user activity data), local channel data (e.g., local channel profile data and local channel activity data). The local channel recommendation engine 460 can be configured to determine recommended channels based on the data stored in the local data store 450 or other accessible data (e.g., channel data stored on the communication platform 310, user data associated with other users), similar to the channel recommendation engine 420 as described above. The local channel management engine 470 can be configured to create and organize user channels for the local user, similar to the channel management engine 430 as described above. The communication application 440 can also include a GUI for chat channel communication, where a user can create, join, or search chat channels. The GUI can also include a tab for displaying recommended channels and organizing joined channels.

In some examples of the present disclosure, implementations may include or otherwise use one or more artificial intelligence or machine learning (collectively, AI/ML) systems having one or more models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization.

Figure 5:
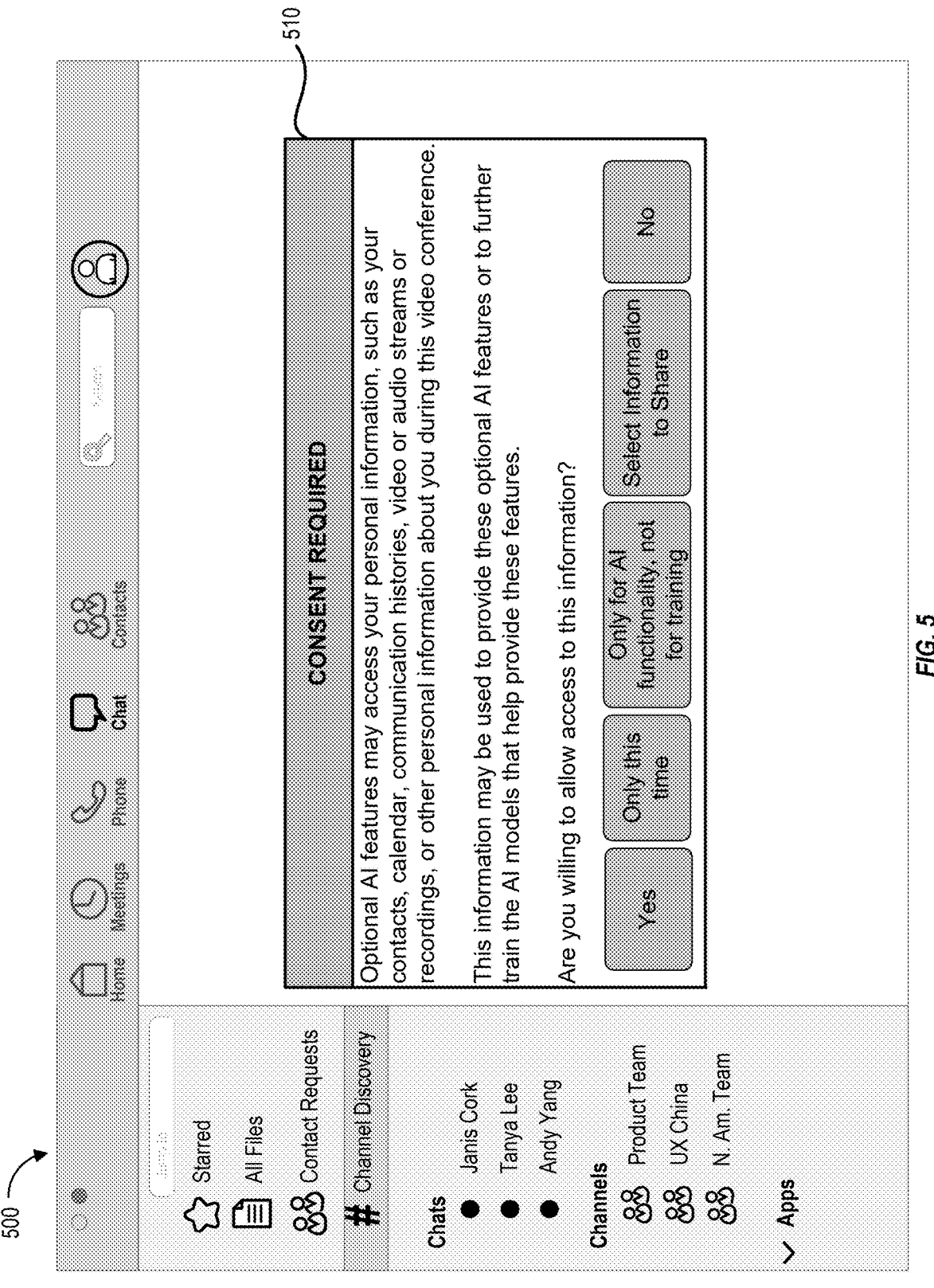
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a communication platform 310, such as the chat and virtual conference provider 110 or the chat and video conference provider 210. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

As can be seen in FIG. 5, a user has landed on a channel discovery page that may use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 6:
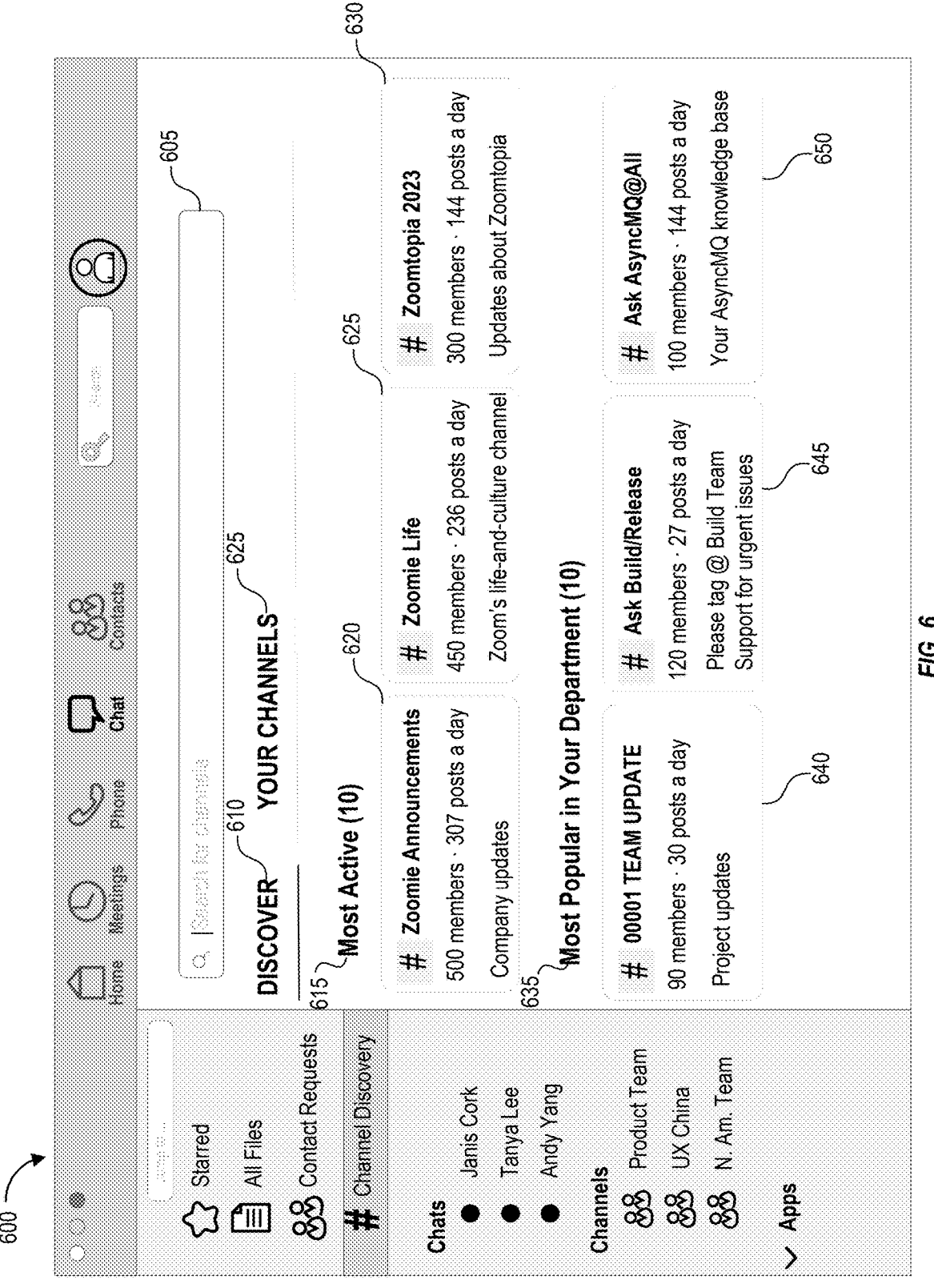
FIG. 6 shows an example GUI displaying a channel discovery page including recommended channels.

Now referring to FIG. 6, FIG. 6 shows an example GUI 600 displaying a channel discovery page including recommended channels. The example GUI 600 includes a channel search box 605, where a user can search for chat channels by entering keywords. The example GUI 600 also includes a "discover" tab 610 displaying recommended channels and a "your channels" tab 625 displaying channels associated with the user. In FIG. 6, the "discover" tab 610 displays the recommended channels in two categories, a "most active" category 615 and a "most popular in your department" category 635. The "most active" category 615 includes 10 recommended channels. If a user clicks or touches the category name, a list of 10 most active channels can be displayed. In the example GUI 600, three most active channels 620, 625, and 630 are displayed in corresponding GUI elements. If a user clicks or touches a GUI element, a corresponding chat channel page is opened. The user may request to join the channel or simply browse the channel content is it is visible to visitors. Similarly, the "most popular in your department" category 635 includes 10 recommended channels. If a user clicks or touches the category name, a list of 10 most popular channels in the user's department can be displayed. In the example GUI 600, three most popular channels in the user's department 640, 645, and 650 are displayed in corresponding GUI elements. Each recommended channel, for example 620, 625, 630, 640, 645, and 650, is determined based on user data and channel data, generally as described in FIG. 4. Each recommended channel in the example GUI also includes a channel description, the number of members, and a number of posts per day.

Figure 7:
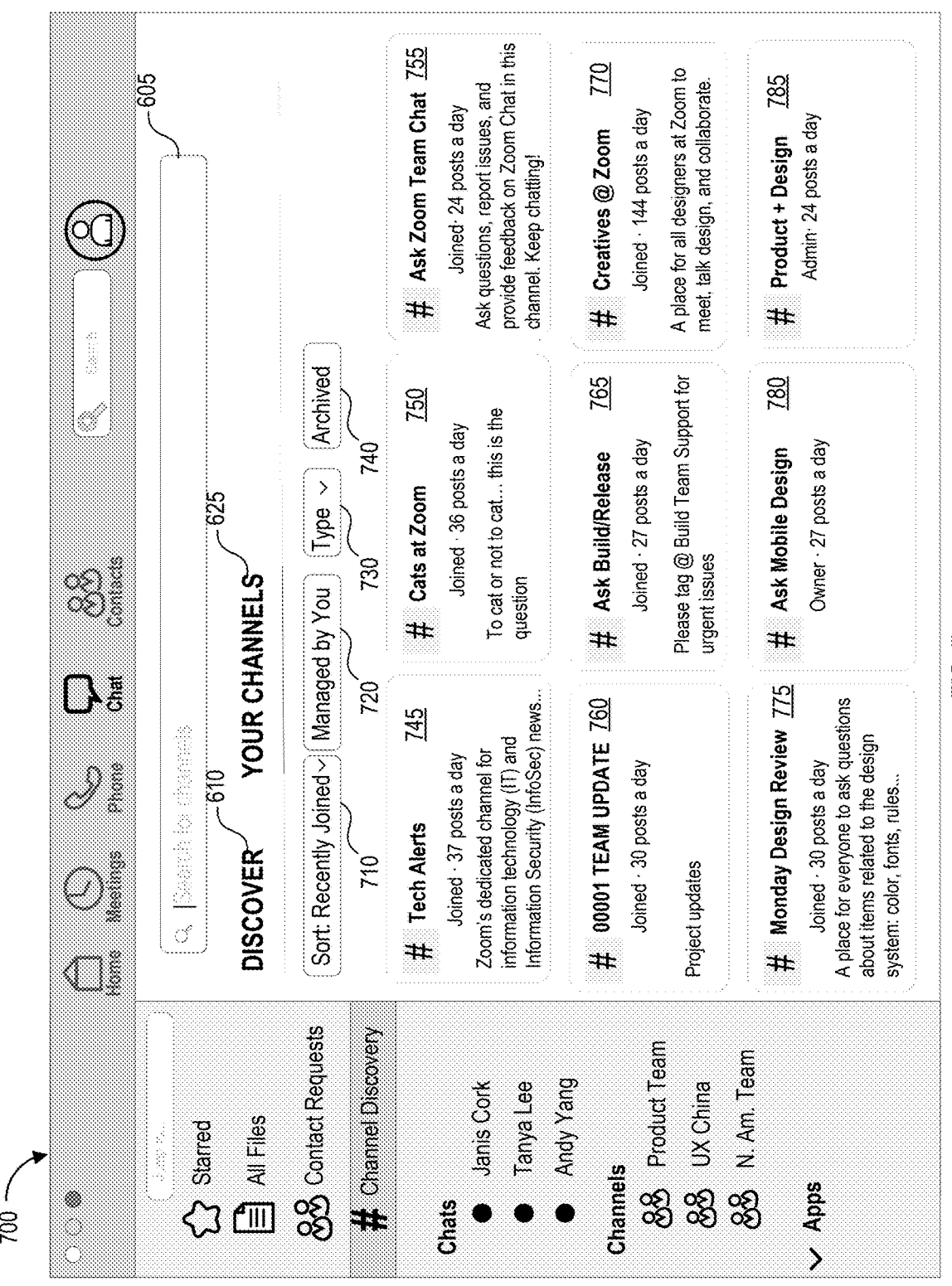
FIG. 7 shows an example GUI displaying a channel page including channels associated with a user.

FIG. 7 shows an example GUI displaying a channel page including channels associated with a user. The example GUI 700 displays the "my channels" tab 625. In FIG. 7, the "my channels" tab includes the channels associated with a user. Some examples of the user channels include channel 745 related to tech alerts joined by the user, channel 750 related to cats at Zoom joined by the user, channel 755 for asking questions about Zoom Team Chat joined by the user, channel 760 related to 00001 team update joined by the user, channel 765 for build and release support joined by the user, channel 770 for creatives joined by the user, channel 775 for Monday design review joined by the user, channel 780 related to mobile design owned by the user, and channel 785 related to product and design where the user is an administrator. The user can sort or display the channels based on different criteria. For example, the user can sort the channels based on when the user joined the channel or when the channels are active, by selecting corresponding criteria in GUI element 710. The user can also select to only display channels that are managed by the user, by activating GUI element 720. The user can also sort or display the channels by type, by choosing a type in GUI element 730. The types of channels can be regular chat channels, huddles (e.g., video-enabled virtual coworking spaces), continuous meeting chats (e.g., chat channels created based on video conferences). Alternatively, or additionally, the types of channels can include channels where the user is only a member, channels where the user is an administrator, and channels where the user is a creator or owner. The user can also display archived channels, by activating GUI element 740. The user may operate on one or more GUI elements of GUI elements 710, 720, 730, 740 to sort out the channels associated with the user.

Now referring to FIG. 8, FIG. 8 shows an example method 800 for context-based channel recommendation and management. The example method 800 will be discussed with respect to the system 400 shown in FIG. 4; however, any suitable system for context-based channel recommendation may be used. The method or process 800 is directed to providing one or more recommended chat channels to a user.

At block 802, a communication platform 310 accesses a first set of user data associated with a first user on a communication platform. The first set of user data can include user profile data and user activity data. Examples of user profile data include user location, job title, joined chat channels. Examples of user activity data include user interactions with other users, user activities in the joined chat channels, and other user activities on the communication platform 310. The first set of user data can be stored in the data store 410 of the communication platform 310. The communication platform 310 may access and process the user data associated with a user by consent.

At block 804, the communication platform 310 accesses channel data associated with a plurality of chat channels on the communication platform 310. The channel data can include channel profile data and channel activity data. Examples of channel profile data include a channel title, a channel description, and channel user (or member) data (e.g., number of members, member profile data). Examples of channel activity data include chat messages in a channel and information about chat messages, such as chat message time, chat frequency, active members, chat topics, etc. The channel data is stored in the data store 410 of the communication platform 310. The communication platform 310 may obtain user consent (e.g., from channel owner and individual members) to access and process the channel data.

At block 806, the communication platform 310 determines one or more recommended chat channels for the first user based on the first set of user data and the channel data. The channel recommendation engine 420 of the communication platform 310 can determine one or more recommended chat channels for the first user, generally as described in FIG. 4. For example, the channel recommendation engine 420 can identify users similar to the first user based on their user profile data or user activity data using a collaborative filtering algorithm. The channel recommendation engine 420 then identifies chat channels joined by the similar users, and recommend to the first user certain chat channels that are joined by the similar users but not by the first user yet. Also for example, the channel recommendation engine 420 can determine or access a social graph representing interactions and relationships between the first user and other users on the communication platform 310. The channel recommendation engine 420 then accesses user data associated with the other users to select one or more users that are similar to the first user, and recommends to the first user joined channels by the one or more selected users but not joined by the first user yet. Yet as another example, the channel recommendation engine 420 can determine an embedding vector for the first user based on the first set of user data, and an embedding vector for each chat channel on the communication platform 310. The channel recommendation engine 420 can determine a similarity score for a chat channel based on the embedding vector for the first user and the embedding vector for the corresponding chat channel, for example by using a similarity model. The chat channels can be ranked based on corresponding similarity scores. One or more chat channels can be selected from the top of the ranked list of chat channels to be recommended to the first user. Yet as another examples, certain active/popular chat channels in the user's department or location may be recommended to the first user.

At block 808, the communication platform 310 provides the one or more recommended chat channels to the first user. The one or more recommended chat channels can be displayed in a GUI on a communication application 440 associated with the first user. The communication platform 310 can generate a customized description for a recommended chat channel, for example based on the why the corresponding channel is recommended to the user. If a chat channel is recommended to the first user because the corresponding chat channel matches recent user search activities, the description of the chat channel can include certain information related to the recent user searches.

In some examples, the communication platform 310 groups the one or more recommended chat channels into one or more categories to create one or more categories of recommended channels. The recommended channels can be organized and displayed in different categories. The communication platform 310 can generate categories names for the one or more categories of recommended channels based on corresponding categorization criteria. For example, if some recommended channels are grouped together because the corresponding channels are recommended based on users whose profiles are similar to the first user, the category can be named as "people who are similar to you also joined." As another example, if some channels are recommended based on the overall activeness, the category can be named as "most active," as displayed in FIG. 6.

In some examples, the first user joins some of the recommended channels. The first user may be associated with multiple channels, as a user, a administrator, or a creator. The channel management engine 430 can organize chat channels, generally as described in FIG. 4. For example, the channel management engine 430 can implement a classification algorithm to sort the channels based on a selected sorting/organizing criterion. Examples of sorting/organizing criteria include "recently joined," "managed by you," "archived," as displayed in FIG. 7.

The example process 800 illustrates a method for context-based channel recommendation, directed to providing one or more recommended chat channels to a user. However, not every step in the example process 800 may be needed, or some other steps may be added. The example process 800 is performed by a communication platform 310. Alternatively, the example process 800 can be performed by a communication application 440 installed on a client device 340.

Now referring to FIG. 9, FIG. 9 shows another example method for context-based channel recommendation and management. The example method 900 will be discussed with respect to the system 400 shown in FIG. 4; however, any suitable system for context-based channel recommendation may be used. The method or process 900 is directed to life-cycle management of a chat channel including creating a chat channel and recommending the chat channel to potential users.

At block 902, a communication platform 310 creates a chat channel based on a user request. The channel management engine 430 of the communication platform 310 can create a chat channel. In some examples, a chat channel is created based on a user request. For example, a user on the communication platform 310 can navigate to a channel creation page via a communication application 440 provided by the communication platform 310 and associated with the user to provide certain information. In some examples, a chat channel is generated automatically for a video conference.

At block 904, the communication platform 310 accesses channel data associated with the chat channel. Channel data can include channel profile data, such as a channel name, a channel description, and channel member data (e.g., number of members, member profile data). The channel data can also include user created content, such as video content, audio content, or text content in the chat channel. The channel management engine 430 of the communication platform 310 can enable the user to create content for the chat channel created at block 902. The content can include video content, audio content, or text content related to one or more subjects. In some examples, the user can create content using certain functionalities provided by the communication platform 310, such as video conferencing and recording.

At block 906, the communication platform 310 access a set of user data associated with multiple users on the communication platform. The user data can include user profile data and user activity data. Examples of user profile data include user location, user interest, joined chat channels. Examples of user activity data include user interactions with other users, user activities in the joined chat channels, user search activities on the communication platform 310. When the first user first creates an account on the communication platform 310, the communication platform 310 may collect information about user interested areas, which can be part of the user profile data.

At block 908, the communication platform 310 recommends the chat channel to one or more users of the multiple users based on the set of user data and the channel data associated with the chat channel. The channel recommendation engine 420 can identify one or more users and recommend the chat channel to the one or more users, generally as described in FIG. 4. In some examples, the channel recommendation engine 420 implements a collaborative filtering algorithm to identify certain users that are similar to channel users already joined the chat channel, based on the set of user data associated with multiple users on the communication platform 310 and the channel data associated with the chat channel (e.g., channel member data). In some examples, the channel recommendation engine 420 determines an embedding vector for the chat channel and an embedding vector for a user on the communication platform. The channel recommendation engine 420 can determine a similarity score for the user based on the embedding vector for the user and the embedding vector for the chat channel. Multiple users can be ranked based on corresponding similarity scores. The channel recommendation engine 420 can select one or more users from the ranked list of users.

The channel recommendation engine 420 can generate a recommendation indicator or message to the one or more selected users. For example, the recommendation message can be displayed via a GUI of the communication application 440 associated with the one or more users. Alternatively, or additionally, the channel recommendation engine 420 can send an email to the one or more users including recommendation of the chat channel.

At block 910, the communication platform 310 enables the one or more users to join the chat channel. In some examples, the one or more users can select to view or join the chat channel via a recommendation indicator, recommendation message, or recommendation email. For example, a "view" button can be included in the recommendation indicator, message, or email for a user to browse the content of the chat channel (if permitted by the channel creator), or a "join" button in the recommendation message or email for a user to join recommended chat channel. In some examples, a joined user can provide user feedback to channel content via chat messages. In some examples, a user can provide user feedback to the channel content without joining the channel.

The example process 900 illustrates another method for context-based channel recommendation and management, directed to life-cycle management of a chat channel. However, not every step in the example process 900 may be needed, or some other steps may be added. The example process 900 is performed by a communication platform 310. Alternatively, the example process 900 can be performed by a communication application 440 installed on a client device 340.

Figure 10:
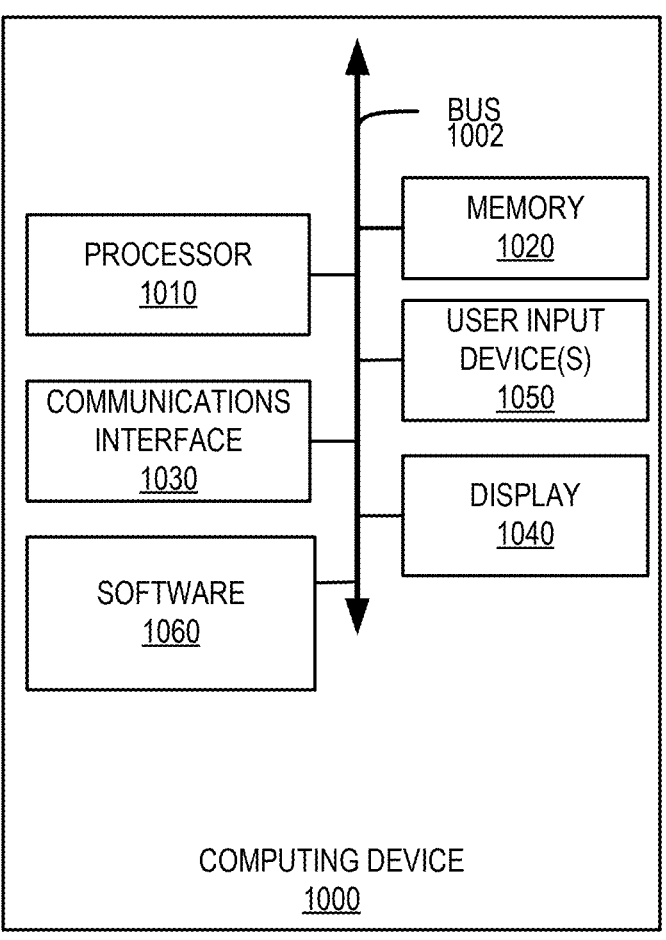
FIG. 10 shows an example computing device suitable for use in example systems or methods for context-based channel recommendation and management, according to certain examples.

Now referring to FIG. 10, FIG. 10 shows an example computing device 1000 suitable for use in example systems or methods for context-based channel recommendation. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for context-based channel recommendation, such as part or all of the example methods 800 or 900, described above with respect to FIGS. 8 and 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user. The computing device 1000 may also include a software 1060. The software 1060 may include a communication application (client application), a communication platform, and any other software to enable communication from a first user to a second user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
accessing a first set of user data associated with a first user on a communication platform;
determining an embedding vector for the first user based on the first set of user data, wherein the first set of user data comprises user profile data and user activity data associated with the first user, and wherein the user activity data comprises data associated with the first user's chat activities and video conference activities on the communication platform;
accessing channel data associated with a plurality of chat channels on the communication platform;
determining an embedding vector for each chat channel on the communication platform based on the channel data;
determining a similarity score based on the embedding vector for the first user and the embedding vector for each channel;
ranking the plurality of chat channels based on corresponding similarity scores to generate a ranked list of chat channels;
selecting one or more recommended chat channels for the first user from the ranked list of chat channels; and
providing the one or more recommended chat channels to the first user.

2. The method of claim 1, wherein the user profile data comprises user location, job title, and joined chat channels.

3. The method of claim 1, wherein the channel data comprises channel profile data and channel activity data, wherein the channel profile data comprises a channel title, a channel description, and member data, wherein the channel activity data comprises information about chat messages from members of an associated channel.

4. The method of claim 1, further comprising:
identifying one or more users similar to the first user using a collaborative filtering algorithm; and
determining the one or more recommended chat channels for the first user based on the first set of user data and a second set of user data associated with the one or more users.

5. The method of claim 1, further comprising:
providing a customized description for each of the one or more recommended chat channels; and
causing the one or more recommended chat channels and corresponding customized descriptions to be displayed in a graphical user interface (GUI).

6. The method of claim 1, further comprising:
grouping the one or more recommended chat channels into one or more categories to create one or more categories of recommended chat channels;
generating one or more category names corresponding to the one or more categories of recommended chat channels based on corresponding categorization criteria; and
causing the one or more categories of recommended chat channels to be displayed in a GUI.

7. The method of claim 1, further comprising:
determining a social graph representing interactions and relationships between the first user and other users on the communication platform;

accessing a second set of user data associated with the other users; and
determining the one or more recommended chat channels for the first user based on the second set of user data associated with the other users.

8. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
access a first set of user data associated with a first user on a communication platform, wherein the first set of user data comprises user profile data and user activity data associated with the first user, and wherein the user activity data comprises data associated with the first user's chat activities and video conference activities on the communication platform;
determine an embedding vector for the first user based on the first set of user data;
access channel data associated with a plurality of chat channels on the communication platform;
determine an embedding vector for each chat channel on the communication platform based on the channel data;
determine a similarity score based on the embedding vector for the first user and the embedding vector for each channel;
rank the plurality of chat channels based on corresponding similarity scores to generate a ranked list of chat channels;
select one or more recommended chat channels for the first user from the ranked list of chat channels; and
provide the one or more recommended chat channels to the first user.

9. The system of claim 8, wherein the one or more processors are configured to execute further processor-executable instructions stored in the non-transitory computer-readable medium to:
identify one or more users similar to the first user using a collaborative filtering algorithm; and
determine the one or more recommended chat channels for the first user based on the first set of user data and a second set of user data associated with the one or more users.

10. The system of claim 8, wherein the one or more processors are configured to execute further processor-executable instructions stored in the non-transitory computer-readable medium to:
provide a customized description for each of the one or more recommended chat channels; and
cause the one or more recommended chat channels and corresponding customized descriptions to be displayed in a graphical user interface (GUI).

11. The system of claim 8, wherein the one or more processors are configured to execute further processor-executable instructions stored in the non-transitory computer-readable medium to:
group the one or more recommended chat channels into one or more categories to create one or more categories of recommended chat channels;
generate one or more category names corresponding to the one or more categories of recommended chat channels; and cause the one or more categories of recommended chat channels to be displayed in a GUI.

12. The system of claim 8, wherein the one or more processors are configured to execute further processor-executable instructions stored in the non-transitory computer-readable medium to:

determine a social graph representing interactions and relationships between the first user and a set of users on the communication platform;

access a second set of user data associated with the set of users; and determine the one or more recommended chat channels for the first user based on the second set of user data associated with the set of users.

13. A non-transitory computer-readable medium comprising processor-executable instructions configured to cause one or more processors to:

access a first set of user data associated with a first user on a communication platform, wherein the first set of user data comprises user profiled data and user activity data associated with the first user, and wherein the user activity data comprises data associated with the first user's chat activities and video conference activities on the communication platform;

determine an embedding vector for the first user based on the first set of user data;

access channel data associated with a plurality of chat channels on the communication platform;

determine an embedding vector for each chat channel on the communication platform based on the channel data;

determine a similarity score based on the embedding vector for the first user and the embedding vector for each channel;

rank the plurality of chat channels based on corresponding similarity scores to generate a ranked list of chat channels;

select one or more recommended chat channels for the first user from the ranked list of chat channels; and provide the one or more recommended chat channels to the first user.

14. The non-transitory computer-readable medium of claim 13, further comprising processor-executable instructions configured to cause one or more processors to:

provide a customized description for each of the one or more recommended chat channels; and cause the one or more recommended chat channels and corresponding customized descriptions to be displayed in a graphical user interface (GUI).

15. The non-transitory computer-readable medium of claim 13, further comprising processor-executable instructions configured to cause one or more processors to:

group the one or more recommended chat channels into one or more categories to create one or more categories of recommended chat channels;

generate one or more category names corresponding to the one or more categories of recommended chat channels; and cause the one or more categories of recommended chat channels to be displayed in a GUI.

16. The non-transitory computer-readable medium of claim 13, further comprising processor-executable instructions configured to cause one or more processors to:

identify one or more users similar to the first user using a collaborative filtering algorithm; and determine the one or more recommended chat channels for the first user based on the first set of user data and a second set of user data associated with the one or more users.

17. The non-transitory computer-readable medium of claim 13, further comprising processor-executable instructions configured to cause one or more processors to:

determine a social graph representing interactions and relationships between the first user and a set of users on the communication platform;

access a second set of user data associated with the set of users; and determine the one or more recommended chat channels for the first user based on the second set of user data associated with the set of users.

* * * * *